July 14, 1931.     H. A. DE VRY     1,813,990
FILM SPOOL
Filed Aug. 29, 1927
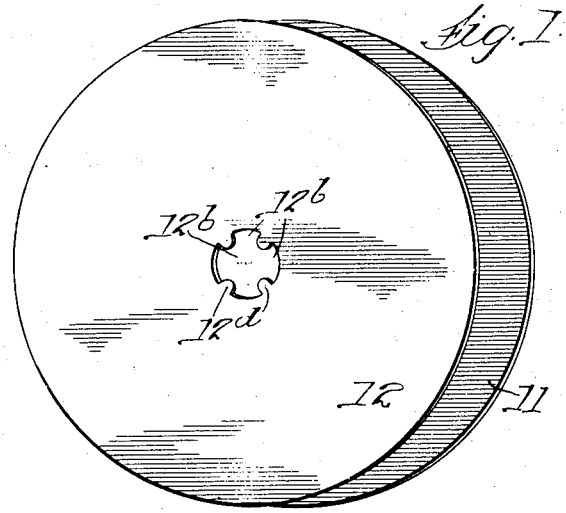
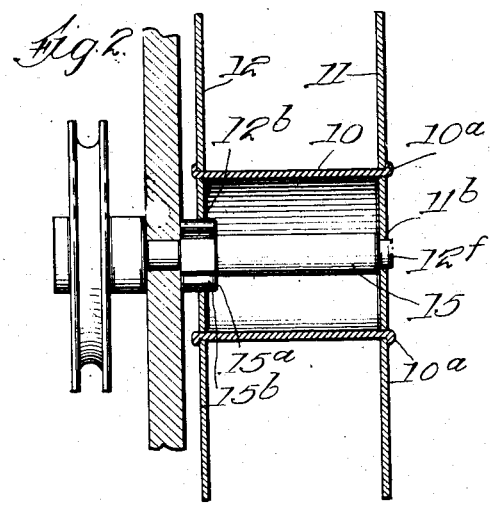
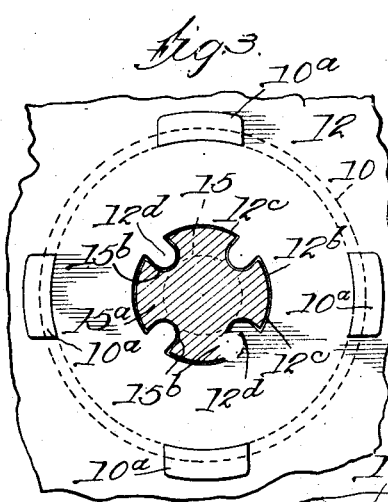
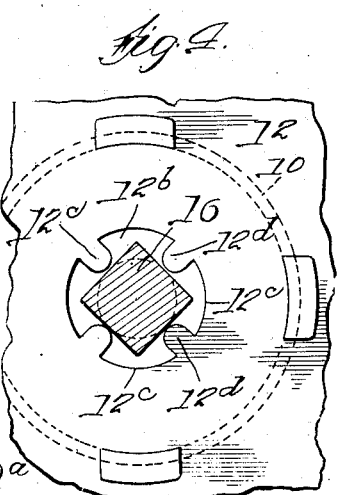
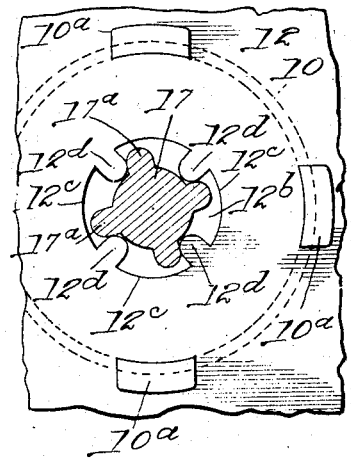
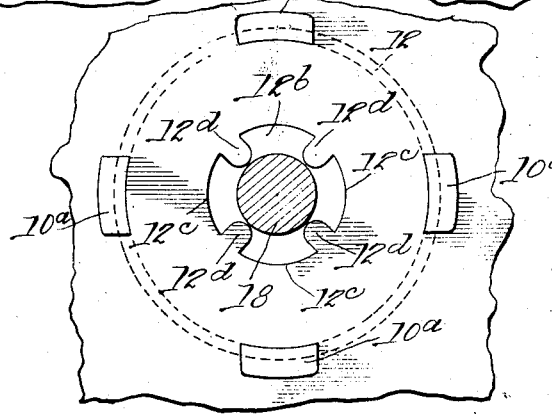
Inventor:
Herman A. de Vry
by Fred Gerlach
his Atty.

Patented July 14, 1931

1,813,990

UNITED STATES PATENT OFFICE

HERMAN A. DE VRY, OF CHICAGO, ILLINOIS, ASSIGNOR TO Q. R. S.-DE VRY CORPORATION, OF CHICAGO, ILLINOIS, A CORPORATION OF ILLINOIS

FILM SPOOL

Application filed August 29, 1927. Serial No. 216,008.

The invention relates to reels or spools for films.

The object of the invention is to provide an improved film reel or spool which may be interchangeably or universally used either as a driven take-up or an idler spool for different makes of projectors and cameras for the reason that it is so constructed that it is adapted for use on shafts of different shapes including a shaft having longitudinal grooves therein.

The invention consists in the several novel features hereinafter set forth and more particularly defined by the claims at the conclusion hereof.

In the drawings which accompany and form a part of this specification or disclosure and in which like numerals and characters of reference denote corresponding parts throughout the several views. Fig. 1 is a perspective of a spool embodying the invention. Fig. 2 is a longitudinal section and Fig. 3 is a detail view of the spool on a grooved driving shaft. Fig. 4 is a view of the spool fitting on a polygonal drive shaft. Fig. 5 is a view of the spool fitting on a drive shaft with outwardly projecting keys. Fig. 6 is a view showing the spool used as as an idler or a feed spool on a circular shaft.

The invention is exemplified in a film reel or spool which is formed of sheet metal and comprises circular, sides or disks 11 and 12 and an annular hub 10 around which the film is wound and to which the end of the film may be secured in any suitable manner. The hub and sides are secured together by tongues 10ª on the hub. These tongues extend through slots in the sides and are upset against the outer faces of the sides.

Side 11 has a central circular opening 11ᵇ for receiving the circular end 12ᶠ of either a drive or a stationary shaft.

Side 12 has a central opening 12ᵇ therein which is shaped to form an annular series of concentric arcuate portions 12ᶜ and four comparatively small straight sided inwardly projecting tongues 12ᵈ which are positioned substantially 90° apart and are arranged in alternating relation with respect to the portions 12ᶜ. By forming the central opening 12ᵇ in the manner set forth, the side 12 is adapted to conform to and fit around a drive shaft of the type that is illustrated in Figs. 2 and 3 of the drawings and is designated by the reference numeral 15. This drive shaft has a member 15ª. The latter has a cylindrical periphery which fits into and conforms to the portions 12ᶜ of opening 12ᵇ. In addition to the cylindrical periphery, member 15ª embodies longitudinal grooves 15ᵇ which receive the tongues 12ᵈ on side 12 and form a driving and supporting connection between side 12 of the spool and the shaft 15.

The spool is applicable to a square shaft 16 as shown in Fig. 4. The corners of the shaft enter the spaces between the tongues 12ᵈ and the inner ends of the tongues engage the faces of the shaft between the corners so that the spool will be centered around the axis of the shaft, and in rotation, the shaft will drivably engage the tongues to rotate the spool.

The spool is applicable to a cylindrical shaft 17 provided with any number of keys or ribs 17ª up to four, as shown in Fig. 5. The tongues 12ᵈ are extended to fit the cylindrical periphery of the shaft to center the spool around the axis of the shaft and keys 17ª enter the spaces between the tongues and engage the sides of the latter to drive the spool.

When the spool is used as a feed or idler spool, it is applicable to a completely cylindrical stationary spindle or shaft 18, as shown in Fig. 6. The inner ends of the tongues 12ᵈ bear on the periphery of the shaft to center and rotatably support the spool.

The invention exemplifies an improved film spool which has an opening which is so constructed or shaped that the spool is universally applicable to different makes of projectors and cameras and is usable in connection with a drive shaft having a cylindrical periphery and with longitudinal grooves therein and drive the spool and to a stationary shaft to rotatably support and center the spool when it is used as an idler or feed spool.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A film spool comprising a hub and sides, each of the sides being provided with a shaft opening, one of the sides having a series of comparatively small tongues projecting into its shaft opening to engage shafts of a predetermined size and center the spool, the marginal or edge portions of said one side between the tongues being concentrically curved to receive a cylindrical shaft having longitudinal grooves therein which interfit with the tongues, or to receive the corners of a polygonal shaft or a projecting key on a cylindrical shaft.

2. A film spool comprising a hub and sides, each of the sides being provided with a central shaft opening, one of the sides having the shaft opening therein truly circular and embodying a plurality of comparatively small straight sided tongues projecting inwardly into the circular opening, so that it is adapted to receive a cylindrical shaft having grooves therein in which fit the tongues, or to receive the corners of a polygonal shaft or an outwardly projecting key on a cylindrical shaft.

Signed at Chicago, Illinois, this 13th day of August, 1927.

HERMAN A. DE VRY.